(12) United States Patent  
Chen et al.

(10) Patent No.: US 9,305,224 B1
(45) Date of Patent: Apr. 5, 2016

(54) METHOD FOR INSTANT RECOGNITION OF TRAFFIC LIGHTS COUNTDOWN IMAGE

(71) Applicant: YUAN ZE UNIVERSITY, Taoyuan County (TW)

(72) Inventors: Duan-Yu Chen, Taoyuan County (TW); Yi-Tung Chou, Taoyuan County (TW)

(73) Assignee: Yuan Ze University, Taiyuan County (TW)

( * ) Notice: Subject to any disclaimer, the term of this patent is extended or adjusted under 35 U.S.C. 154(b) by 19 days.

(21) Appl. No.: 14/499,692

(22) Filed: Sep. 29, 2014

(51) Int. Cl.
*G06K 9/00* (2006.01)
*G06K 9/46* (2006.01)
*G06K 9/62* (2006.01)
*G06T 3/40* (2006.01)

(52) U.S. Cl.
CPC .......... *G06K 9/00825* (2013.01); *G06K 9/4642* (2013.01); *G06K 9/4652* (2013.01); *G06K 9/628* (2013.01); *G06K 9/6215* (2013.01); *G06T 3/4053* (2013.01)

(58) Field of Classification Search
CPC ............ G06K 9/00825; G06K 9/4642; G06K 9/4652; G06K 9/6215; G06K 9/628; G06T 3/4053
See application file for complete search history.

(56) References Cited

U.S. PATENT DOCUMENTS

| | | | | |
|---|---|---|---|---|
| 6,859,546 B2* | 2/2005 | Matsukawa | ........ | G06K 9/00818 342/90 |
| 7,230,538 B2* | 6/2007 | Lai | ......................... | A61H 3/061 340/4.12 |
| 7,512,252 B2* | 3/2009 | Otsuka | ................. | B60Q 1/1423 382/104 |
| 8,134,480 B2* | 3/2012 | Onome | ............ | G08G 1/096716 340/905 |
| 8,233,662 B2* | 7/2012 | Bhotika | .................. | B61L 3/065 382/104 |
| 8,498,479 B2* | 7/2013 | Saito | ................... | G06K 9/00798 382/106 |
| 8,559,673 B2* | 10/2013 | Fairfield | ............. | G06K 9/00825 342/357.25 |
| 8,638,990 B2* | 1/2014 | Kudo | ................... | G06K 9/2054 382/104 |
| 8,670,612 B2* | 3/2014 | Kido | .................... | G06K 9/4652 382/104 |
| 8,751,154 B2* | 6/2014 | Zhang | .................... | B60W 30/09 348/119 |
| 8,855,367 B2* | 10/2014 | Kido | .................. | G06K 9/00805 382/103 |
| 8,861,787 B2* | 10/2014 | Kido | .................. | G06K 9/00791 382/103 |
| 8,989,439 B2* | 3/2015 | Kido | .................. | G06K 9/00805 382/103 |
| 9,025,026 B2* | 5/2015 | Takahashi | ................ | G06K 9/00 340/907 |

(Continued)

OTHER PUBLICATIONS

Chiu et al., "Real-time traffic light detection on resource-limited mobile platform", May 2014, Consumer Electronics—Taiwan (ICCE-TW), 2014 IEEE International Conference on, 211-212.*

(Continued)

*Primary Examiner* — Katrina Fujita
(74) *Attorney, Agent, or Firm* — Rosenberg, Klein & Lee (57) ABSTRACT

A method for instant recognition of traffic lights countdown image that can quickly scan and confirm the circular feature image of a traffic light, and retrieve the countdown image thereof by calculating the displacement ratio from the circular image, then enhance, cut and converse the countdown image to display a feature image thereof, and proceed similarity comparison with collected data to calculate the percentage of similarity. The method eventually brings out a result from the image comparisons, so as to fulfill the effectiveness of searching and instantly recognizing the countdown image of a traffic light.

2 Claims, 7 Drawing Sheets

(56) References Cited

U.S. PATENT DOCUMENTS

| | | | |
|---|---|---|---|
| 9,070,305 B1* | 6/2015 | Raman | G09B 21/001 |
| 9,099,005 B2* | 8/2015 | Kido | G08G 1/165 |
| 9,105,089 B2* | 8/2015 | Watarai | H04N 5/77 |
| 9,145,140 B2* | 9/2015 | Ferguson | G05D 1/0231 |
| 9,158,980 B1* | 10/2015 | Ferguson | G06K 9/00825 |
| 9,165,197 B2* | 10/2015 | Aimura | G06K 9/00825 |
| 9,205,835 B2* | 12/2015 | Stein | B60W 30/00 |
| 2010/0033571 A1* | 2/2010 | Fujita | B60W 40/02 348/149 |
| 2012/0249795 A1* | 10/2012 | Ito | G06K 9/00825 348/148 |
| 2015/0154461 A1* | 6/2015 | Kitaura | G06K 9/00845 348/148 |
| 2015/0186734 A1* | 7/2015 | Nakagawa | G06K 9/00791 382/104 |
| 2015/0232026 A1* | 8/2015 | Lueke | B60Q 9/00 701/1 |
| 2015/0294167 A1* | 10/2015 | Zhang | G06K 9/00825 382/103 |

OTHER PUBLICATIONS

Le et al., "Real Time Traffic Sign Detection Using Color and Shape-Based Features", 2010, Intelligent Information and Database Systems, vol. 5991 of the series Lecture Notes in Computer Science, 268-278.*

* cited by examiner

METHOD FOR INSTANT RECOGNITION OF TRAFFIC LIGHTS COUNTDOWN IMAGE

BACKGROUND OF THE INVENTION

1. Field of the Invention

The invention relates to a method for instant recognition of traffic lights countdown image that can quickly scan and confirm the circular feature of a traffic light, and retrieve the countdown image thereof by calculating the displacement ratio from the circular feature, then process the countdown image to display a feature image thereof and bring out the recognition result.

2. Description of the Related Art

Traffic lights have red, yellow, and green lights, among which the red and green lights may have countdown function to remind the drivers when the lights are about to change, so as to eliminate safety concerns during the driving.

Nevertheless, the drivers may lose attention to the countdown of traffic lights due to poor sight or distraction when driving, and thus cause irreparable loss. Also, optical illusion may happen owning to long time driving or exhaustion; but the optical illusion can be remedied by machine vision to recognize the status of the countdown.

However, there are still some defects for machine vision to recognize the countdown image of traffic lights because of unexpected situations caused by traffic and environment variation. Firstly, the countdown has different image of numbers with the passing of time; consequently, the machine vision has to process different contours of the numbers individually. When the machine vision cannot proceed with the image of numbers in time, it cannot further proceed with the recognition, therefore decreasing its reliability. Secondly, when the ambient light is weak, the retrieved image may have diffraction areas and result in difficulty in retrieving the exact image and conversing the image to binary mode in accordance with its features. Such problem cannot be solved even if the image is enhanced. Besides, the countdown image is conversed from RGB image to greyscale image, but the LED light source emitting the countdown numbers would cause detailed and undetectable changes of the greyscale image. Hence, the countdown image can be difficult to recognize due to the effects from the ambient lights, and the contours of the figures are different, making the recognizing process even more complicated and the entire process is therefore slower.

SUMMARY OF THE INVENTION

It is a primary object of the present invention to provide a method for instant recognition of traffic lights countdown image that can quickly scan and confirm the circular feature of a traffic light and retrieve the countdown image thereof by calculating the displacement ratio from the circular feature, so as to provide a solution to the problem of finding the countdown image of a traffic light in the prior art.

Another object of the present invention is to provide a method for instant recognition of traffic lights countdown image that proceeds the countdown image with enhancing, cutting, and recognizing operation, so as to provide a solution to the problem of slow detection of the counting-down in the prior art.

In order to achieve the objects above, the present invention comprises the following steps: retrieving information of a real-time image that is divided into a plurality of partitions, each having the four corners as confirmed pixels which are processed within HSL (hue, saturation, lightness) color space; scanning the color features—hue, saturation, and lightness—of the confirmed pixels and when the color features conform to the predetermined ones, rendering the confirmed pixels as candidate pixels which turn the neighboring four partitions into candidate regions; searching the neighboring confirmed pixels of the candidate pixels that resemble the features thereof and render them as candidate pixels as well until every neighboring confirmed pixel is checked, and merging all the candidate pixels and the candidate regions thereof together as a group; conversing the merged candidate regions within HSL color space by adjusting the threshold value of the lightness of said merged candidate regions with adaptive threshold algorithm, conversing into a binary image of lightness, and then conversing the binary image of lightness into an edge image of lightness after the edge detection processing, then intersecting the edge image of lightness and a binary image of hue conversed from the candidate regions in accordance with its range of color, and producing an edge image which has a feature of circular image found after Hough transform algorithm operation and to be compared with a predetermined circular shape of a traffic light; confirming the circular feature as the shape of a traffic light and then retrieving a countdown image by calculating the displacement ratio from the circular image; enhancing said countdown image by super resolution algorithm and conversing into a greyscale image, then adjusting the threshold value thereof by adaptive threshold algorithm and conversing into an image of binary numbers; gathering the horizontal and vertical projection information of the image of binary numbers, finding the threshold value of the top and bottom edge thereof and figuring out the width and the estimated cutting curve thereof, and then cutting the image of binary numbers along the cutting curve calculated by partial distribution statistics of the vertical projection information near the estimated cutting curve, then applying the block coding algorithm to display a feature image by dividing the image of binary numbers into equal rectangular blocks, calculating the ratio of black pixels and white pixels of each rectangular block, and encoding the results; and classifying and concluding all collected images of numbers by a plurality of classifiers with machine learning algorithm to analyze and compare with the feature image, and calculating the percentage of similarity, then bringing out the image of the highest percentage as the recognition result among the ones from the classifiers.

In the process mentioned above, the range of the hue is from 0.3 to 0.92 after normalization.

As stated above, the present invention can quickly scan and confirm the circular feature of a traffic light, and retrieve the countdown image thereof by calculating the displacement ratio from the circular feature, then enhance, cut and converse the countdown image to display a feature image thereof so as to fulfill the effectiveness of searching and instantly recognizing the countdown image of a traffic light.

DETAILED DESCRIPTION OF THE PREFERRED EMBODIMENT

Referring to FIGS. 1 to 7, a preferred embodiment of the present invention includes steps as following. Step 1 S1: initiating the process. Step 2 S2: retrieving information of a real-time image that is divided into a plurality of partitions, each having the four corners as the confirmed pixels which are processed within HSL (hue, saturation, lightness) color space. FIG. 2A is a partial image of the real-time image that is divided into 12 partitions C1, C2, C3, C4, C5, C6, C7, C8, C9, C10, C11, C12, in which the fifth partition C5 has its four corners as the first, second, third, and fourth confirmed pixels P1, P2, P3, and P4, and the sixth partition has its four corners as the second, fourth, fifth, and sixth confirmed pixels P2, P4, P5, and P6.

Figure 1:
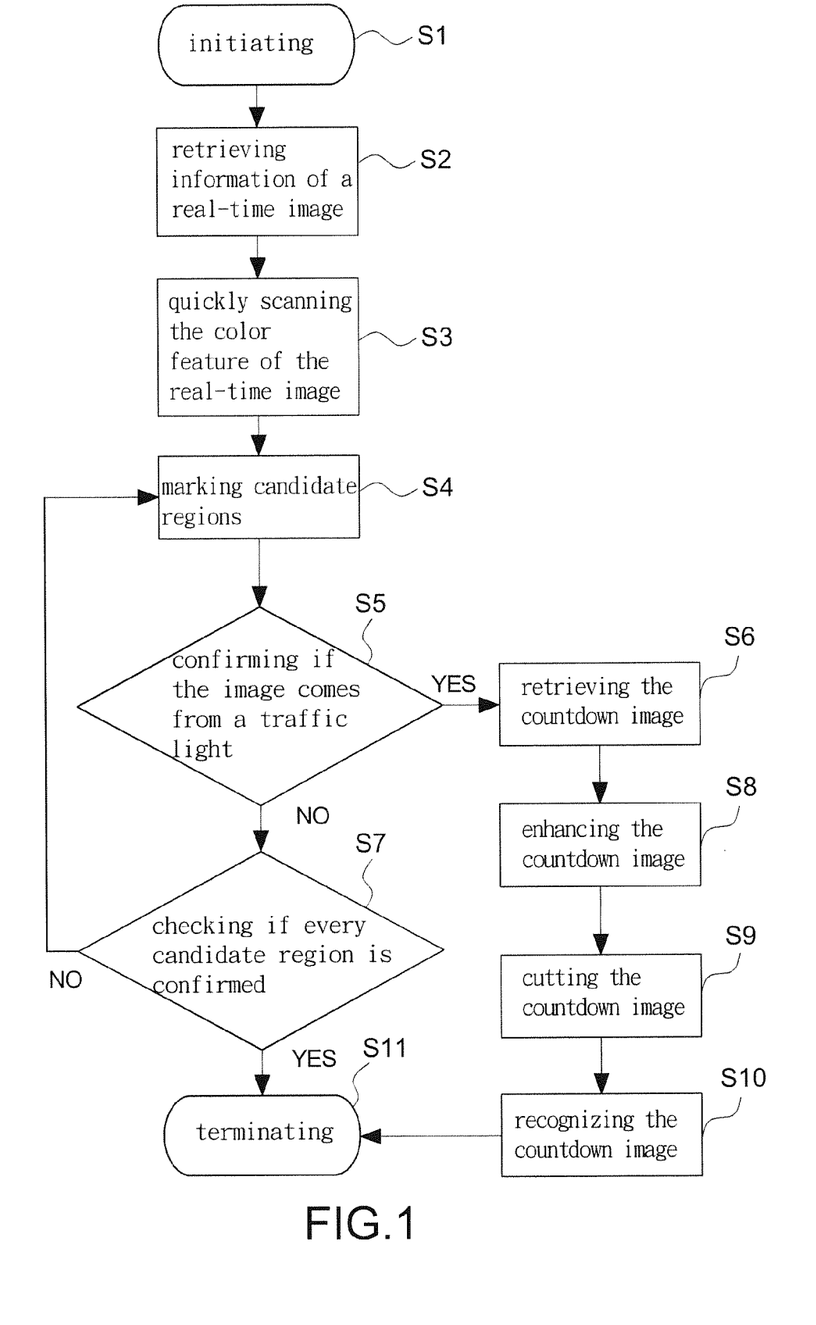
FIG. 1 is a flow diagram of the present invention.
Figure 2A:
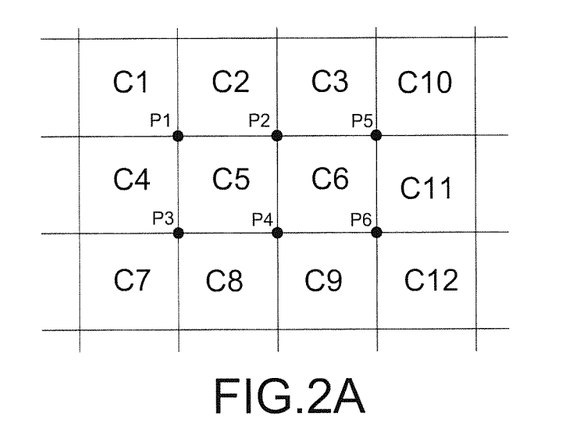
FIG. 2A is a schematic diagram illustrating the settling of confirmed pixels of the present invention.
Figure 2B:
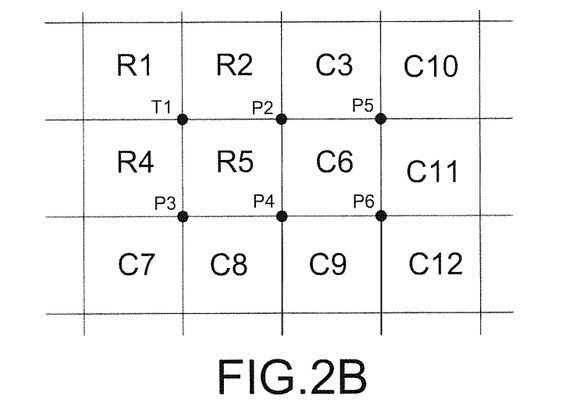
FIG. 2B is a schematic diagram illustrating a confirmed pixel becoming a candidate pixel and rendering its neighboring area as candidate regions.

Step 3 S3: scanning the color features—hue, saturation, and lightness—of the confirmed pixels and when the features conform to the predetermined ones, rendering the confirmed pixels as candidate pixels which turn the neighboring four partitions into candidate regions. In this embodiment, the range of the hue is from 0.3 to 0.92 after normalization, but it is not limited to such application. In FIG. 2B, the first confirmed pixel P1 conforms to the predetermined color features and becomes the first candidate pixel T1, rendering the neighboring first, second, fourth, and fifth partitions C1, C2, C4, and C5 as the first, second, fourth, and fifth candidate regions R1, R2, R4, and R5.

Figure 2C:
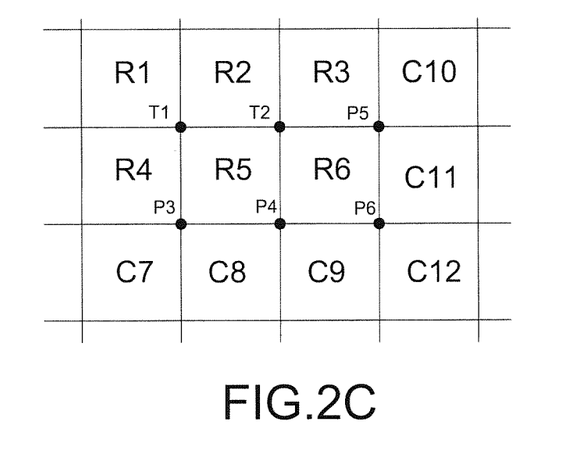
FIG. 2C is a schematic diagram illustrating a resembling confirmed pixel becoming another candidate pixel and rendering its neighboring area as candidate regions.

Step 4 S4: searching the neighboring confirmed pixels of the candidate pixels that resemble the features thereof and render them as candidate pixels as well until every neighboring confirmed pixel is checked, and merging all the candidate pixels and the candidate regions thereof together as a group. As shown in FIG. 2C, in this embodiment, the color features of the second confirmed pixel P2 resemble the ones of the first candidate pixel T1, rendering the second confirmed pixel P2 as the second candidate pixel T2. When there is no other candidate pixel, the first and second candidate pixels T1, T2 merge into a group together with the first, second, third, fourth, fifth, and sixth candidate regions R1, R2, R3, R4, R5, and R6.

Figure 3A:
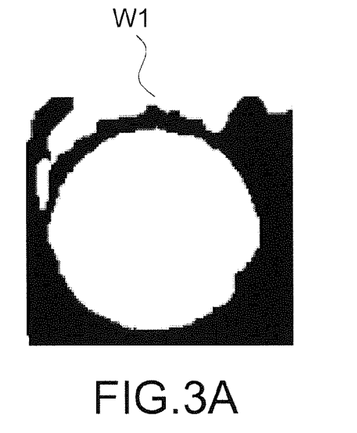
FIG. 3A is a schematic diagram of a binary image of lightness conversed from the hue of the candidate regions.
Figure 3B:
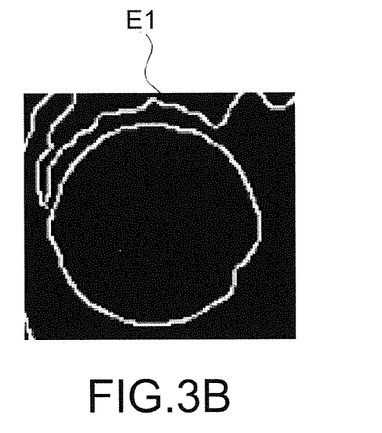
FIG. 3B is a schematic diagram of an edge image of lightness according to the present invention.
Figure 3C:
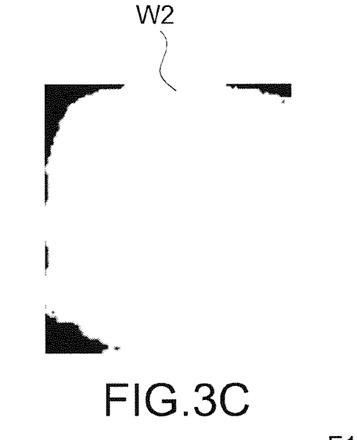
FIG. 3C is a schematic diagram illustrating the hue of the candidate regions conversing into a binary image.
Figure 3D:
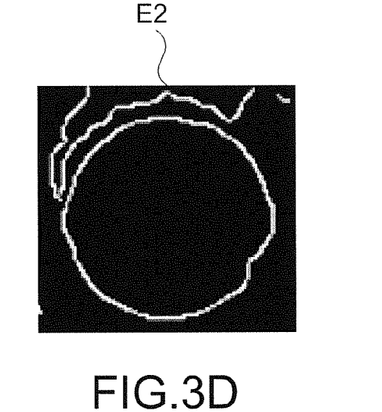
FIG. 3D is a schematic diagram of an edge image produced after intersecting process according to the present invention.
Figure 3E:
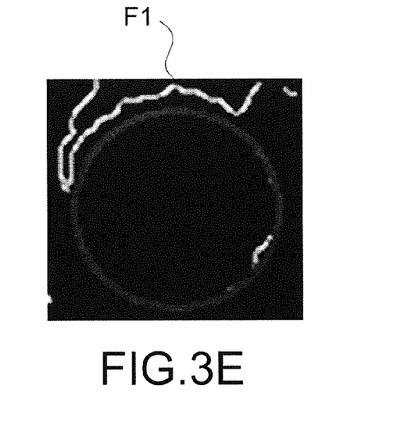
FIG. 3E is a schematic diagram illustrating the circular feature found by the method of the present invention.

Step 5 S5: conversing the merged candidate regions within HSL color space by adjusting the threshold value of the lightness of said merged candidate regions with adaptive threshold algorithm, conversing into a binary image of lightness W1 as shown in FIG. 3A, and then conversing the binary image of lightness W1 into an edge image of lightness E1 after the edge detection processing as illustrated in FIG. 3B; then intersecting the edge image of lightness E1 and a binary image of hue presented in FIG. 3C, conversed from the candidate regions in accordance with its range of color; the result of intersecting is shown in FIG. 3D. With reference to FIG. 3E, an edge image E2 is produced which has a feature of circular image F1 found after Hough transform algorithm operation and to be compared with a predetermined circular shape of a traffic light.

Figure 4:
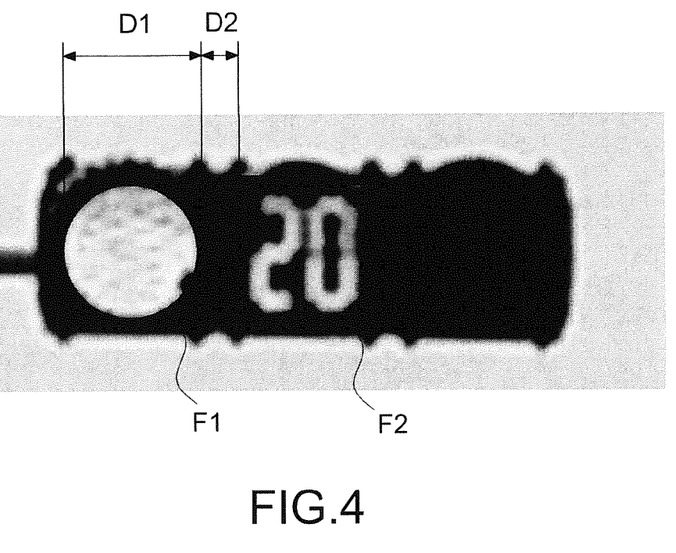
FIG. 4 is a schematic diagram of a countdown image retrieved by the method of the present invention.

Step 6 S6: referring to FIG. 4, confirming the feature of circular image F1 as the shape of a traffic light and then retrieving the center and the diameter D1 thereof to calculate the displacement ratio D2 from the circular image F1 and then retrieve the countdown image F2; if the confirmation failed, go to step 7 S7: reexamining the candidate regions for another confirmation process as in step 6 S6. If there is another area within the regions to be confirmed, go to step 4 S4 and run the process again therefrom; if every area within the candidate regions is examined and the confirmation still failed, go to step 11 S11: terminating the process.

Figure 5A:
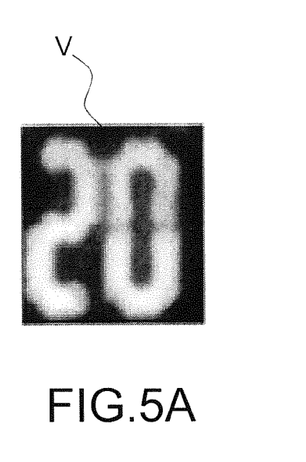
FIG. 5A is a schematic diagram of a greyscale image of the image retrieved by the method of the present invention.
Figure 5B:
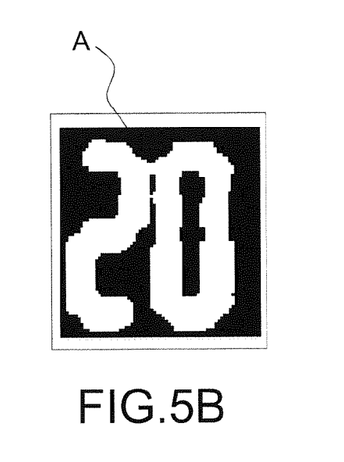
FIG. 5B is a schematic diagram of a binary image of the image retrieved by the method of the present invention.
Figure 6A:
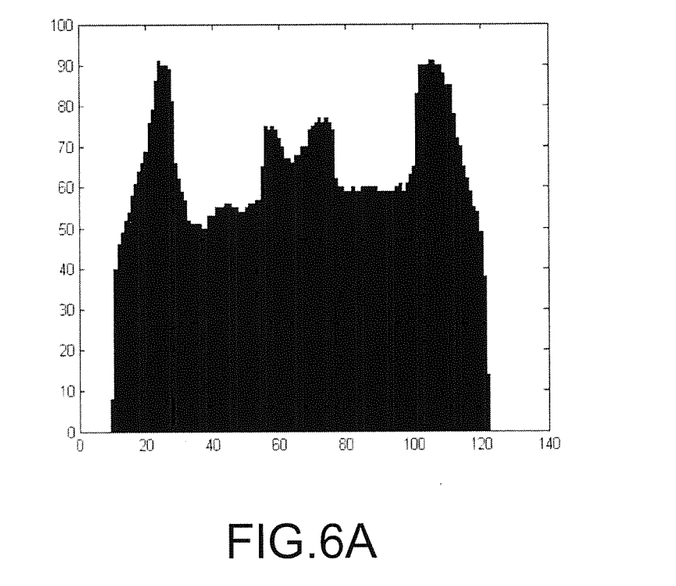
FIG. 6A is a horizontal projection histogram of the binary image according to the present invention.
Figure 6B:
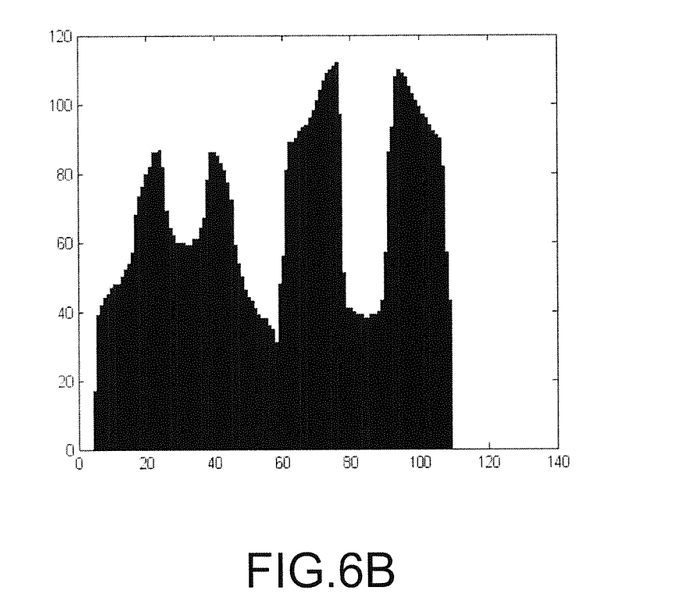
FIG. 6B is a vertical projection histogram of the binary image according to the present invention.
Figure 6C:
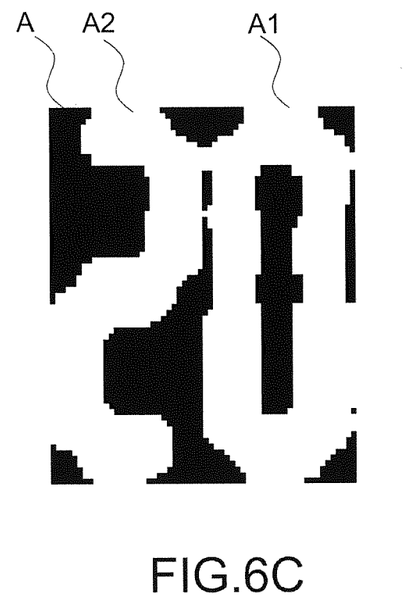
FIG. 6C is a schematic diagram of a numeral image according to the present invention with the surrounding blank area excised.
Figure 6D:
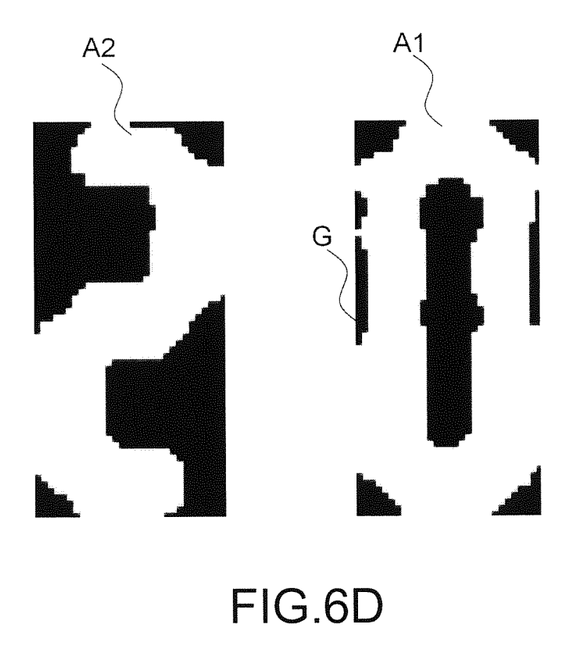
FIG. 6D is a schematic diagram of cut numeral image according to the present invention.

Step 8 S8: as shown in FIG. 5A, enhancing said countdown image F2 by super resolution algorithm and conversing into a greyscale image V, then adjusting the threshold value thereof by adaptive threshold algorithm and conversing into an image of binary numbers A as presented in FIG. 5B.

Step 9 S9: with reference to FIGS. 6A, 6B, 6C and 6D, gathering the horizontal and vertical projection information of the image of binary numbers A, finding the threshold value of the top and bottom margin thereof, excising the surrounding blank area and figuring out the width and the estimated cutting curve G thereof, and then cutting the image of binary numbers along the cutting curve calculated by partial distribution statistics of the vertical projection information near the estimated cutting curve.

In this embodiment, the image of binary numbers A includes a digit of the units A1 and a digit of the tens A2. To find out the estimated cutting curve, the position of the digit of the units A1 has to be located first, according to which the one of the digit of the tens A2 is located as well; then find out the right-hand margin of the digit of the units A1, according to which the left-hand margin thereof as well. The estimated cutting curve G is therefore confirmed as the left-hand margin of the digit of the units A1. Then perform an operation on the vertical projection of the area within 10 pixels extending from the estimated position to both sides thereof, so as to find the exact cutting curve.

Figure 7:
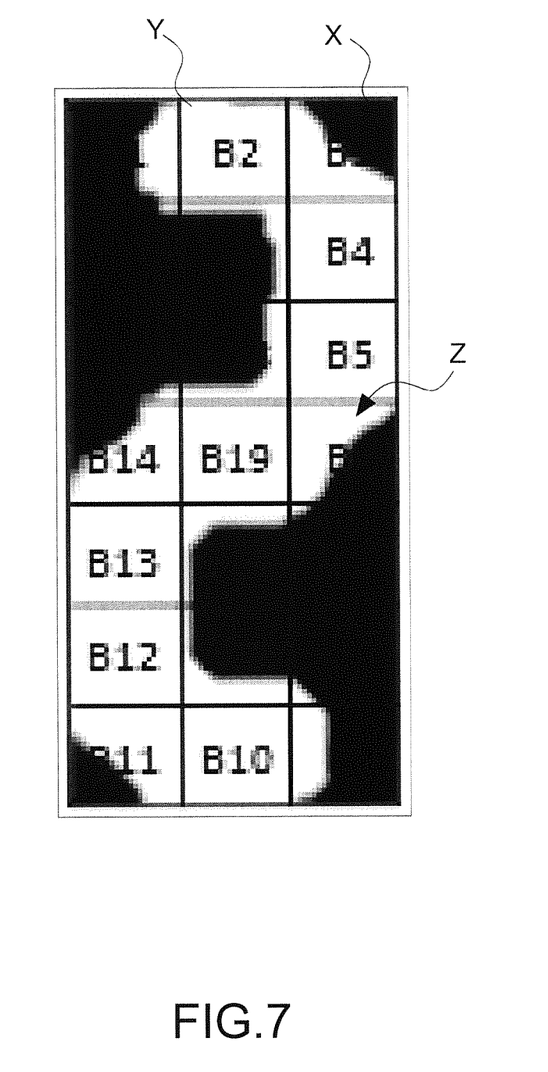
FIG. 7 is a schematic diagram of a feature image according to the present invention.

Referring to FIG. 7, dividing the image of binary numbers A equally into twenty-one rectangular blocks and assign as B1~B12; calculating the ratio of black pixels X and white pixels Y of each rectangular block and encoding the results to converse into a feature image Z. The amount of the white pixels Y within each block is the descriptor. Besides, in order to have an identical standard for processing, each side of the blocks is defined as 20 pixels, thus defining each block having 400 pixels within.

Step 10 S10: classifying and concluding all collected images of numbers by a plurality of classifiers with machine learning algorithm to analyze and compare with the feature image Z, and calculating the percentage of similarity, then bringing out the image of the highest percentage as the recognition result among the ones from the classifiers. Step 11 S11: terminating the process.

The method for instant recognition of traffic lights countdown image can be written as a program and further applied when being installed on devices with shooting function. For example, it can be applied to navigation systems for best route analysis, instant traffic monitor, or traffic warning system for drivers. Also, it can be applied to cloud systems for keeping track of the countdown of other traffic lights nearby. With the applications, the present invention has achieved effectiveness of instant recognition and expanded tracking and monitoring in the practical fields.

What is claimed is:

1. A method for instant recognition of traffic lights countdown image, comprising:

retrieving information of a real-time image that is divided into a plurality of partitions, each having the four corners as confirmed pixels which are processed within HSL (hue, saturation, lightness) color space;

scanning the HSL color features of the confirmed pixels and when the color features conform to predetermined ones, rendering the confirmed pixels as candidate pixels which turn the neighboring four partitions into candidate regions;

searching the neighboring confirmed pixels of the candidate pixels that resemble the features thereof and render them as candidate pixels as well until every neighboring confirmed pixel is checked, and merging all the candidate pixels and the candidate regions thereof together as a group;

conversing the merged candidate regions within HSL color space by adjusting the threshold value of the lightness of said merged candidate regions with adaptive threshold algorithm, conversing into a binary image of lightness, and then conversing the binary image of lightness into an edge image of lightness after edge detection processing, then intersecting the edge image of lightness and a binary image of hue conversed from the candidate regions in accordance with its range of color, and producing an edge image which has a feature of circular image found after Hough transform algorithm operation and to be compared with a predetermined circular shape of a traffic light;

confirming the circular feature as the shape of a traffic light and then retrieving a countdown image by calculating the displacement ratio from the circular image;

enhancing said countdown image by super resolution algorithm and conversing into a greyscale image, then adjusting the threshold value thereof by adaptive threshold algorithm and conversing into an image of binary numbers;

gathering horizontal and vertical projection information of the image of binary numbers, finding a threshold value of the top and bottom edge thereof and figuring out a width and estimated cutting curve thereof, and then cutting the image of binary numbers along the cutting curve calculated by partial distribution statistics of the vertical projection information and the estimated cutting curve, then applying the block coding algorithm to display a feature image by dividing the image of binary numbers into equal rectangular blocks, calculating the ratio of black pixels and white pixels of each rectangular block, and encoding the results; and classifying and concluding all collected images of numbers by a plurality of classifiers with machine learning algorithm to analyze and compare with the feature image, and calculating the percentage of similarity, then bringing out the image of the highest percentage as the recognition result among the ones from the classifiers.

2. The method as claimed in claim 1, wherein the range of the hue is from 0.3 to 0.92 after normalization.

\* \* \* \* \*